(12) United States Patent
Shikagawa et al.

(10) Patent No.: US 10,848,073 B2
(45) Date of Patent: Nov. 24, 2020

(54) MOTOR DRIVE APPARATUS EQUIPPED WITH DISCHARGE CIRCUIT OF CAPACITOR OF DC LINK

(71) Applicant: Fanuc Corporation, Yamanashi (JP)

(72) Inventors: Tsutomu Shikagawa, Yamanashi (JP); Hitoshi Ishida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/524,804

(22) Filed: Jul. 29, 2019

(65) Prior Publication Data

US 2020/0044577 A1   Feb. 6, 2020

(30) Foreign Application Priority Data

Jul. 31, 2018 (JP) .................................. 2018-143831

(51) Int. Cl.
| | |
|---|---|
| *H02M 5/458* | (2006.01) |
| *H02M 7/797* | (2006.01) |
| *H02P 25/04* | (2006.01) |
| *H02M 1/32* | (2007.01) |
| *H02M 7/219* | (2006.01) |
| *H02P 27/06* | (2006.01) |

(52) U.S. Cl.
CPC .......... *H02M 5/4585* (2013.01); *H02M 1/32* (2013.01); *H02M 7/219* (2013.01); *H02M 7/797* (2013.01); *H02P 25/04* (2013.01); *H02P 27/06* (2013.01); *H02M 2001/322* (2013.01)

(58) Field of Classification Search
CPC ...... H02M 1/32; H02M 5/4585; H02M 7/797; H02M 7/219; H02M 2001/322; H02P 25/04; H02P 27/06; H02P 11/00
See application file for complete search history.

(56) References Cited

U.S. PATENT DOCUMENTS

| | | | |
|---|---|---|---|
| 5,465,202 A | 11/1995 | Ibori et al. | |
| 5,659,233 A | 8/1997 | Nashiki | |
| 2010/0149844 A1* | 6/2010 | Yasuda | H02M 1/32 363/95 |

FOREIGN PATENT DOCUMENTS

| | | |
|---|---|---|
| CN | 106786452 A | 5/2017 |
| JP | 60197179 A | 10/1985 |
| JP | 04207986 A | 7/1992 |
| JP | 05252755 A | 9/1993 |

(Continued)

*Primary Examiner* — Jue Zhang
*Assistant Examiner* — Trinh Q Dang
(74) *Attorney, Agent, or Firm* — RatnerPrestia

(57) ABSTRACT

A motor drive apparatus includes a converter configured to convert AC power from an AC power supply into DC power and then output the DC power to a DC link, a capacitor provided in the DC link, an inverter configured to convert DC power in the DC link into AC power for motor drive, a discharge circuit which is provided in parallel with the capacitor in the DC link, and is selectively switched between a discharge operation of discharging DC power in the DC link by electrically connecting the discharge circuit and the capacitor to each other, and a non-discharge operation of cutting electric connection between the discharge circuit and the capacitor, and a discharge circuit drive unit configured to perform switch drive of the discharge operation and the non-discharge operation of the discharge circuit by using DC power of the DC link as drive power for the switch drive.

10 Claims, 6 Drawing Sheets

(56) References Cited

FOREIGN PATENT DOCUMENTS

| JP | 08205584 A | 8/1996 |
| JP | 2003-088144 A | 3/2003 |
| JP | 2010239736 A | 10/2010 |
| JP | 201324385 A | 12/2013 |
| JP | 2017192993 A | 10/2017 |
| JP | 2017193993 A | 10/2017 |

* cited by examiner

MOTOR DRIVE APPARATUS EQUIPPED WITH DISCHARGE CIRCUIT OF CAPACITOR OF DC LINK

CROSS-REFERENCE TO RELATED APPLICATIONS

This application is a new U.S. Patent Application that claims benefit of Japanese Patent Application No. 2018-143831, dated Jul. 31, 2018, the disclosure of this application is being incorporated herein by reference in its entirety for all purposes.

BACKGROUND OF THE INVENTION

1. Field of Invention

The present invention relates to a motor drive apparatus equipped with a discharge circuit of a capacitor of a DC link.

2. Description of the Related Art

In a motor drive apparatus which drives a machine tool, forging machinery, an injection molding machine, industrial machinery, or motors in various robots, AC power supplied from an AC power supply is converted into DC power by a converter (rectifier) and then output to a DC link, the DC power in the DC link is further converted into AC power by an inverter, and then this AC power is supplied to a motor provided for each drive axis as drive power. A "DC link" refers to a circuit portion which electrically connects a DC output side of a converter and a DC input side of an inverter to each other, and is sometimes otherwise referred to as a "DC link portion", a "direct-current link", a "direct-current link portion", a "direct-current intermediate circuit", or the like.

A DC link is provided with a capacitor having a function of storing energy, and a function of suppressing a pulsation component of output on a DC side of a converter. A capacitor provided in a DC link is also referred to as a smoothing capacitor or a DC link capacitor, but in the present description, is simply referred to as a "capacitor".

In such a case as a case where power consumption of a motor driven by a motor drive apparatus is great or a case where a plurality of inverters are connected to a DC link in a motor drive apparatus, capacity of a capacitor provided in a DC link becomes greater, and sometimes ranges, for example, from several thousand to several hundred thousand μF or more. After power-off of a motor drive apparatus or at a time of occurrence of a power failure, there is a need to discharge a charge as early as possible in order to reduce a risk of an electric shock resulting from a charge remaining in a capacitor. Thus, a discharge circuit is sometimes provided in a DC link in order to discharge a charge stored in a capacitor in a short time.

For example, as described in Japanese Unexamined Patent Application Publication No. 2003-88144, there is known an inverter control apparatus including: a converter which converts an AC power supply input via a contactor into a DC power supply; an inverter which converts, into an AC power supply having a given frequency, the DC power supply output between main circuit DC buses by the converter; a smoothing capacitor which is connected between the main circuit DC buses and smoothes the DC power supply; a control apparatus which controls the converter and the inverter, based on inter-terminal voltage of the smoothing capacitor, an input state of the converter, an output state of the inverter, and the like; a discharge circuit connected in parallel with the smoothing capacitor, and composed of a transistor for discharge and a resistor for discharge connected to a current input side of the transistor for discharge; a first contact relay and a second contact relay which are two contact relays having secondary sides connected in common to a control terminal of the transistor for discharge, and perform an open/close operation in association with an on/off operation of the contactor, the first contact relay closing a circuit at an on-time of the contactor, the second contact relay closing a circuit at an off-time of the contactor; a transistor drive means for applying, to a primary side of the first contact relay, a power supply causing the transistor for discharge to perform an off-operation, and applying, to a primary side of the second contact relay, a power supply causing the transistor for discharge to perform an on-operation; and a power supply backup circuit configured by a backup capacitor connected to the primary side of the second contact relay and charged by a power supply causing the transistor for discharge to perform an on-operation, and a diode blocking discharge from the backup capacitor to a power supply side at a time of a power failure.

SUMMARY OF INVENTION

A capacitor provided in a DC link between a converter and an inverter in a motor drive apparatus takes more time for discharge when having greater capacity. A charge remains in a capacitor for a moment after power-off of a motor drive apparatus or after occurrence of a power failure, and therefore, for the moment, there is a risk of an electric shock, maintenance and replacement work or recovery work may not be performed, and work efficiency is poor. In order to be able to start work early after power-off of a motor drive apparatus or after occurrence of a power failure, it is preferable to remove a risk of an electric shock by discharging a charge stored in a capacitor as early and certainly as possible, and ensure safety of a worker. When a discharge circuit is provided in a DC link between a converter and an inverter in a motor drive apparatus, a discharge time of a capacitor can be shortened, and therefore, a risk of an electric shock is reduced, and work efficiency is also improved. However, when discharge is performed in a discharge circuit during a normal operation of a motor drive apparatus, wasteful power consumption is produced. Thus, during a normal operation of a motor drive apparatus, a discharge circuit needs to be separated from a DC link in such a way that discharge is not performed (non-discharge operation), and after power-off of a motor drive apparatus or after occurrence of a power failure, a discharge circuit needs to be connected to a DC link in such a way that discharge is performed (discharge operation). It is considered that such switching between a non-discharge operation and a discharge operation of a discharge circuit is controlled by a control unit in a motor drive apparatus. However, since a power supply is not supplied to a control unit in a motor drive apparatus either when a power failure occurs, a discharge circuit may not be connected to a DC link, and as a result, discharge by the discharge circuit does not function, a discharge time becomes longer, and a risk of an electric shock becomes higher. Further, in order to cope with power supply disappearance at a time of occurrence of a power failure, providing a power supply backup circuit for a discharge circuit is considered. However, providing a power supply backup circuit for a discharge circuit leads to an increase in a circuit mounting area, an increase in the number of components, and an increase in cost, and is not preferable. Moreover, as the number of components increases, a risk of a failure also increases, and reliability deteriorates. Therefore, there is desired a low-cost and highly reliable technique being capable of discharging a capacitor provided in a DC link between a converter and an inverter in a motor drive apparatus early and certainly at a time of power supply disappearance.

According to one aspect of the present disclosure, a motor drive apparatus includes: a converter configured to convert AC power from an AC power supply into DC power and then output the DC power to a DC link; a capacitor provided in the DC link; an inverter configured to converts DC power in the DC link into AC power for motor drive and then output the AC power; a discharge circuit provided in parallel with the capacitor in the DC link, the discharge circuit being selectively switched between a discharge operation of discharging DC power in the DC link by electrically connecting the discharge circuit and the capacitor to each other, and a non-discharge operation of cutting electric connection between the discharge circuit and the capacitor; and a discharge circuit drive unit configured to perform switch drive of the discharge operation and the non-discharge operation of the discharge circuit, the discharge circuit drive unit using DC power in the DC link as drive power for the switch drive.

BRIEF DESCRIPTION OF THE DRAWINGS

The present invention will be more clearly understood with reference to the following accompanying drawings.

DETAILED DESCRIPTION

A motor drive apparatus equipped with a discharge circuit of a capacitor of a DC link will be described below with reference to drawings. The drawings use different scales as appropriate for ease of understanding. A mode illustrated in each drawing is an example for implementing the present invention, and the present invention is not limited to illustrated embodiments.

Figure 1:
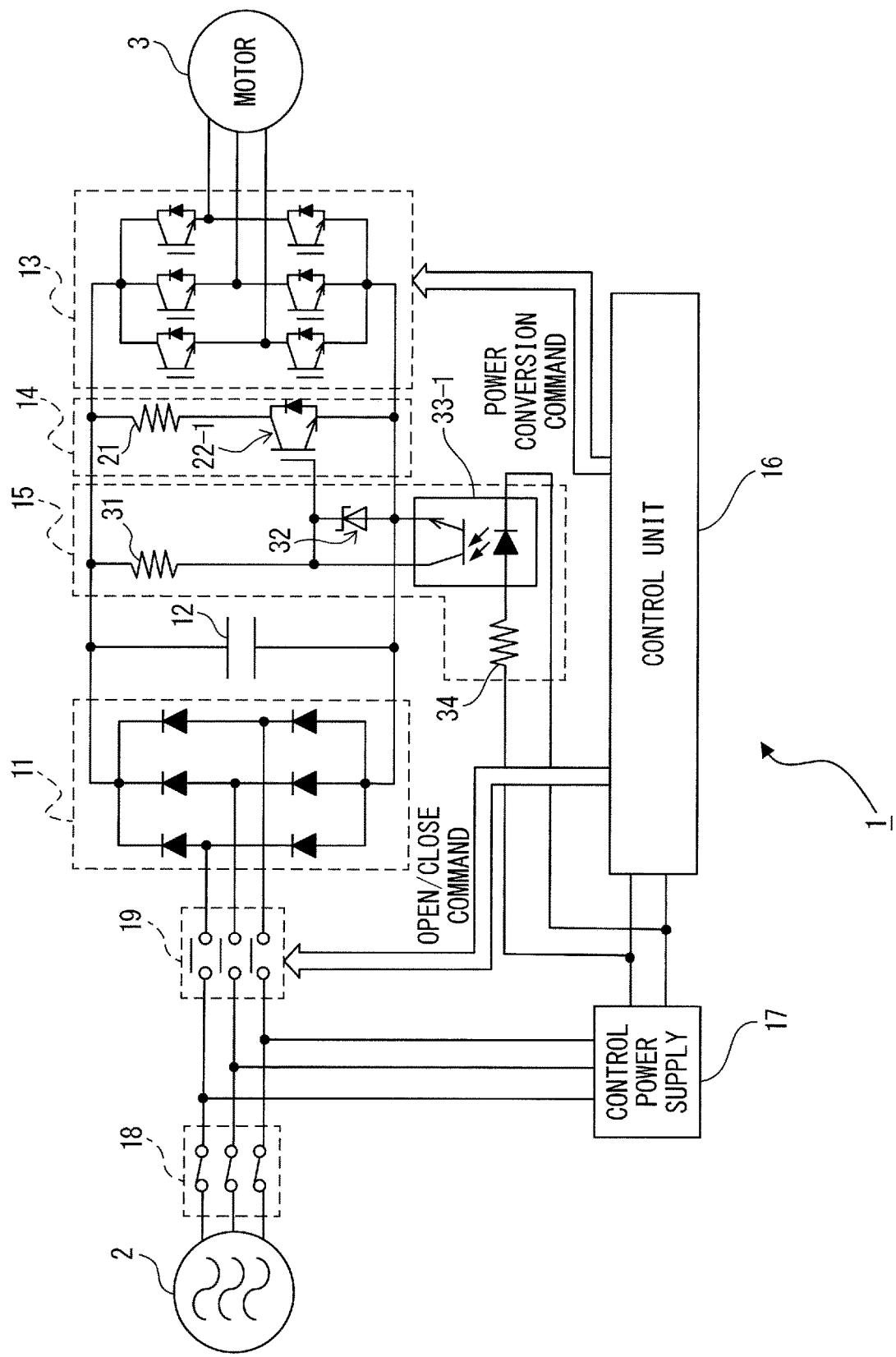
FIG. 1 is a diagram illustrating a motor drive apparatus according to a first embodiment of the present disclosure.

First, a circuit configuration of a motor drive apparatus according to a first embodiment of the present disclosure is described. FIG. 1 is a diagram illustrating the motor drive apparatus according to the first embodiment of the present disclosure.

As one example, a case of controlling one AC motor (hereinafter simply referred to as a "motor") 3 by a motor drive apparatus 1 connected to an AC power supply 2 will be described. The number of the motors 3 does not particularly limit the present embodiment and may be a number other than this number. For example, when a plurality of motors 3 are driven in the motor drive apparatus 1, an inverter 13 is provided for each motor 3, and therefore, a plurality of inverters 13 are connected to a DC link. Note that the number of phases of each of the AC power supply 2 and the motor 3 does not particularly limit the present embodiment, and may be, for example, three phases or a single phase. A three-phase AC 400 V power supply, a three-phase AC 200 V power supply, a three-phase AC 600 V power supply, a single-phase AC 100 V power supply, or the like is cited as one example of the AC power supply 2. Further, a type of the motor 3 does not particularly limit the present embodiment either and may be, for example, an induction motor or a synchronous motor. Herein, for example, machines provided with the motor 3 include a machine tool, a robot, forming machinery, an injection molding machine, industrial machinery, various types of electric appliances, a train, an automobile, and an aircraft.

As illustrated in FIG. 1, the motor drive apparatus 1 according to the present embodiment includes a converter 11, a capacitor 12, an inverter 13, a discharge circuit 14, a discharge circuit drive unit 15, a control unit 16, and a control power supply 17.

As in a general motor drive apparatus, the control unit 16 in the motor drive apparatus 1 controls the inverter 13 which performs power conversion between DC power in a DC link and AC power being drive power or regenerated power of the motor 3. In other words, the control unit 16 generates a switching command for controlling a speed of the motor 3, torque, or a position of a rotor, based on a speed (speed feedback) of the motor 3, current (current feedback) flowing in a winding of the motor 3, a predetermined torque command, an operation program of the motor 3, and the like. A power conversion operation by the inverter 13 is controlled, based on a power conversion command generated by the control unit 16.

Furthermore, the control unit 16 controls an open/close operation of an electromagnetic contactor 19. In other words, the control unit 16 outputs a close command to the electromagnetic contactor 19 at a time of power application of the motor drive apparatus 1, and outputs an open command to the electromagnetic contactor 19 at a time of power-off of the motor drive apparatus 1. A close operation of electrically connecting the AC power supply 2 and the converter 11 to each other is achieved by receiving a close command from the control unit 16 and then closing a contact of the electromagnetic contactor 19, and an open operation of electrically blocking the AC power supply 2 and the converter 11 from each other is achieved by opening and separating the contact of the electromagnetic contactor 19. Note that, for example, a relay or a power semiconductor switching element may replace the electromagnetic contactor 19 as long as the relay or the power semiconductor switching element can block flow of AC power into the converter 11 when receiving a close command by the control unit 16.

Note that the control unit 16 may be built, for example, in a form of a software program, or may be built by a combination of various types of electronic circuits and a software program. For example, when these components are each built in a form of a software program, a function of each of the above-described units may be implemented by causing an arithmetic processing device present in the motor drive apparatus 1 to operate in accordance with the software program. Alternatively, the control unit 16 may be implemented as a semiconductor integrated circuit on which a software program implementing a function of each unit is written. Further, the control unit 16 may be, for example, a numerical value control apparatus of a machine tool.

The control power supply 17 is provided in a system different from that of the converter 11 and the inverter 13 for supplying drive power to the motor 3, and generates DC power for driving the control unit 16, based on AC power from the AC power supply 2. Although illustration is omitted here, the control power supply 17 includes, for example, a converter (rectifier) configured to convert AC power supplied from the AC power supply 2 side into DC power and then output the DC power, and a DC converter configured to convert the DC power output by the converter into DC power for the control power supply 17 and then output the DC power. Note that DC power generated by the control power supply 17 may be supplied to other peripheral equipment (not illustrated) of the motor drive apparatus 1. The control power supply 17 outputs DC voltages of, for example, 3.3 [V], 5 [V], 24 [V], and the like. For example, 3.3 [V] and 5 [V] are utilized for driving of the control unit 16, and 24 [V] is utilized for operations of an electromagnetic brake (not illustrated), other control systems, and the like provided in the motor 3.

A breaker 18 is provided between the converter 11 and the control power supply 17, and the AC power supply 2. The breaker 18 is also referred to as a molded case circuit breaker. The breaker 18 closes an electric circuit (closed circuit) at a normal time, and when abnormal overcurrent flows into the motor drive apparatus 1 (secondary side) due to a factor such as an overload or a short circuit, the breaker 18 opens an electric circuit (open circuit), and then blocks power supply from the AC power supply 2 (primary side). When an electric circuit of the breaker 18 is opened, power supply from the AC power supply 2 to each of the converter 11 and the control power supply 17 is blocked, and therefore, the converter 11 no longer outputs DC power to the DC link, and the control power supply 17 no longer outputs DC power to the control unit 16.

The converter 11 converts AC power supplied from the AC power supply 2 into DC power and then outputs the DC power to the DC link. Note that supply of AC power from the AC power supply 2 to the converter 11 is performed at a time in which the AC power supply 2 and the converter 11 are electrically connected to each other when both the breaker 18 and the electromagnetic contactor 19 are in a closed circuit state. When at least one of the breaker 18 and the electromagnetic contactor 19 is in an open circuit state, AC power is not supplied to the converter 11.

The converter 11 has only to be a component being capable of converting supplied AC power into DC power and then outputting the DC power, and includes, for example, a diode rectification circuit, a rectification circuit of a PWM switching control scheme including a switching element therein, or the like. When the converter 11 is a diode rectifier, power conversion is possible only in one direction from AC power to DC power, and when the converter 11 is a rectification circuit of a PWM switching control scheme, power conversion in both directions including power conversion from AC power to DC power and power conversion from DC power to AC power is possible. The converter 11 is configured as a three-phase bridge circuit when the AC power supply 2 is a three-phase power supply, and the converter 11 is configured as a single-phase bridge circuit when the AC power supply 2 is a single-phase power supply. When the converter 11 is a rectification circuit of a PWM switching control scheme, the converter 11 is composed of a bridge circuit of a semiconductor switching element and a diode connected in antiparallel with the semiconductor switching element. In this case, although examples of the semiconductor switching element include an FET, an IGBT, a thyristor, a gate turn-off thyristor (GTO), silicon carbide (SiC), a transistor, and the like, a type of semiconductor switching element itself does not limit the present embodiment, and the semiconductor switching element may be another semiconductor switching element. Note that an AC reactor is connected to an AC input side of the converter 11, but illustration of the AC reactor is omitted herein.

A DC output side of the converter 11 and a DC input side of the inverter 13 are connected to each other via the DC link. The DC link is provided with the capacitor 12. The capacitor 12 has a function of storing energy (DC power) in the DC link, and a function of suppressing a pulsation component of output on a DC side of the converter 11. The capacitor 12 is charged with a charge, and thereby, DC power is stored in the DC link. Examples of the capacitor 12 provided in the DC link include, for example, an electrolytic capacitor, a film capacitor, and the like. Note that, although voltage (DC link voltage) applied across both positive and negative electrode terminals of the capacitor 12 provided in the DC link is used for control of the inverter 13 by the control unit 16, illustration of a detection unit for detecting DC link voltage is omitted in FIG. 1.

The inverter 13 converts DC power in the DC link into AC power for motor drive and then outputs the AC power to the motor 3. The inverter 13 has only to have a configuration being capable of converting DC power into AC power, and includes, for example, a PWM inverter circuit equipped with a switching element therein, or the like. The inverter 13 is configured as a three-phase bridge circuit when the motor 3 is a three-phase AC motor, and the inverter 13 is configured by a single-phase bridge circuit when the motor 3 is a single-phase motor. When receiving a power conversion command from the control unit 16, the inverter 13 converts DC power in the DC link into AC power for motor drive and then outputs the AC power to the motor 3, and at a time of motor regeneration, the inverter 13 converts AC power regenerated in the motor 3 into DC power and then returns the DC power to the DC link side. When the inverter 13 is configured by a PWM inverter circuit, the inverter 13 is composed of a bridge circuit of a semiconductor switching element and a diode connected in antiparallel with the semiconductor switching element. In this case, although examples of the semiconductor switching element include an FET, an IGBT, a thyristor, a gate turn-off thyristor (GTO), silicon carbide (SiC), a transistor, and the like, a type of semiconductor switching element itself does not limit the present embodiment, and the semiconductor switching element may be another semiconductor switching element.

The discharge circuit 14 is provided in parallel with the capacitor 12 in the DC link. By later-described switch drive of the discharge circuit drive unit 15, the discharge circuit 14 is selectively switched between a discharge operation of discharging DC power in the DC link by electrically connecting the discharge circuit 14 and the capacitor 12 to each other, and a non-discharge operation of cutting electric connection between the discharge circuit 14 and the capacitor 12. Thus, the discharge circuit 14 includes a discharge unit 21 and a switch for discharge switch. Although the discharge unit 21 is provided on a high-potential side and the switch for discharge switch is provided on a low-potential side in the discharge circuit 14 in the example illustrated in FIG. 1, the discharge unit 21 and the switch for discharge switch may be provided in an interchanged way.

In the example illustrated in FIG. 1, the switch for discharge switch in the discharge circuit 14 is configured by a semiconductor switch circuit 22-1 which electrically connects the discharge unit 21 and the capacitor 12 to each other and cuts electric connection between the discharge unit 21 and the capacitor 12 in response to switch drive by the discharge circuit drive unit 15. The semiconductor switch circuit 22-1 as the switch for discharge switch is composed of, for example, a semiconductor switching element and a diode connected in antiparallel with the semiconductor switching element. Although examples of the semiconductor switching element include an FET, an IGBT, a thyristor, a gate turn-off thyristor (GTO), silicon carbide (SiC), a transistor, and the like, a type of semiconductor switching element itself does not limit the present embodiment, and the semiconductor switching element may be another semiconductor switching element. The semiconductor switch circuit 22-1 includes a signal input terminal connected to a high-potential side terminal of a later-described constant voltage output unit 32 in the discharge circuit drive unit 15. A detailed connection relation between the discharge circuit 14 and the discharge circuit drive unit 15 will be described later. Further, another mode of the switch for discharge switch will be also described later.

The discharge unit 21 in the discharge circuit 14 is provided in order to discharge DC power stored in the capacitor 12 provided in the DC link, in a condition in which the discharge unit 21 and the capacitor 12 are electrically connected to each other by the semiconductor switch circuit 22-1 as the switch for discharge switch, and output of DC power from the converter 11 is stopped. In other words, in a case where the semiconductor switch circuit 22-1 electrically connects the discharge unit 21 and the capacitor 12 to each other when output of DC power from the converter 11 is stopped, a closed circuit is configured between the capacitor 12 and the discharge unit 21, and DC power in the DC link is consumed in the discharge unit 21. The discharge unit 21 is configured by equipment which consumes electric energy (current) flowing in the discharge unit 21 by converting the electric energy into other energy. Although specific examples of the discharge unit 21 include, for example, a resistor element, light emitting equipment such as an LED or a light bulb, acoustic equipment such as a buzzer or a speaker, a motor, and the like, but the discharge unit 21 may be equipment other than such equipment. In FIG. 1, the discharge unit 21 is configured by a resistor element as an example.

For example, when the discharge unit 21 is configured by a resistor, electric energy flowing in the discharge unit 21 is consumed in such a form as to be converted into heat energy in the resistor. In this case, since a worker can recognize that the discharge unit 21 is discharging by heat generation of the resistor as the discharge unit 21, the worker can take such a measure as not to touch the capacitor 12 and a peripheral part thereof, a risk of an electric shock is avoided, and safety of a worker can be ensured.

For example, when the discharge unit 21 is configured by light emitting equipment, electric energy flowing in the discharge unit 21 is consumed in such a form as to be converted into light energy in the light emitting equipment. In this case, since a worker can recognize that the discharge unit 21 is discharging by light emission of the light emitting equipment as the discharge unit 21, the worker can take such a measure as not to touch the capacitor 12 and a peripheral part thereof, a risk of an electric shock is avoided, and safety of a worker can be ensured.

For example, when the discharge unit 21 is configured by acoustic equipment, electric energy flowing in the discharge unit 21 is consumed in such a form as to be converted into sound energy in the acoustic equipment. In this case, since a worker can recognize that the discharge unit 21 is discharging by sound emitted by the acoustic equipment as the discharge unit 21, the worker can take such a measure as not to touch the capacitor 12 and a peripheral part thereof, a risk of an electric shock is avoided, and safety of a worker can be ensured.

For example, when the discharge unit 21 is configured by a motor, electric energy flowing in the discharge unit 21 is consumed in such a form as to be converted into kinetic energy in the motor. For example, when a vibration plate is attached to the motor as the discharge unit 21, electric energy flowing in the discharge unit 21 can be converted into vibration energy. In this case, since a worker can recognize that the discharge unit 21 is discharging by vibration of the vibration plate attached to the motor as the discharge unit 21, the worker can take such a measure as not to touch the capacitor 12 and a peripheral part thereof, a risk of an electric shock is avoided, and safety of a worker can be ensured.

Note that the discharge unit 21 may be a component which converts electric energy as energy other than those presented herein as examples.

The discharge circuit drive unit 15 performs switch drive of the discharge circuit 14 between a discharge operation and a non-discharge operation. DC power stored in the capacitor 12 provided in the DC link is used as drive power for switch drive by the discharge circuit drive unit 15. The discharge circuit drive unit 15 has a configuration which performs switch drive of switching the discharge circuit 14 from a non-discharge operation to a discharge operation at a time of disappearance of power from the control power supply 17. A more detailed description is given as follows.

As illustrated in FIG. 1, the discharge circuit drive unit 15 includes a current limiting resistor 31, the constant voltage output unit 32, and a switch for power supply disappearance detection.

The current limiting resistor 31 includes a first terminal connected to a positive side terminal of the capacitor 12, and a second terminal to which current input from the first terminal is output. A resistance value of the current limiting resistor 31 in the discharge circuit drive unit 15 is set to a value greater than a resistance value of the discharge unit 21 in the discharge circuit 14. To cite one example, the current limiting resistor 31 in the discharge circuit drive unit 15 is at several ten kΩ to several hundred kΩ, and the discharge unit 21 in the discharge circuit 14 is at several kΩ to several ten kΩ. The numerical values cited herein are examples only, and any other numerical values may be used.

The constant voltage output unit 32 includes the high-potential side terminal connected to the second terminal of the current limiting resistor 31, and a low-potential side terminal connected to a negative side terminal of the capacitor 12. The constant voltage output unit 32 outputs predetermined constant voltage between the high-potential side terminal and the low-potential side terminal. The constant voltage output unit 32 is composed of a Zener diode connected in such a way that, for example, the high-potential side terminal serves as a cathode, and the low-potential side terminal serves as an anode. A Zener diode is also referred to as a constant-voltage diode (reference diode). A Zener diode indicates a property substantially similar to that of a normal diode when voltage is applied in a forward bias direction, but indicates a property that current rapidly flows due to avalanche breakdown when voltage applied in a reverse bias direction exceeds breakdown voltage (Zener voltage). The Zener diode as the constant voltage output unit 32 has the cathode connected to the second terminal of the current limiting resistor 31 and the signal input terminal of the semiconductor switch circuit 22-1 being the switch for discharge switch in the discharge circuit 14, and the anode connected to the negative side terminal of the capacitor 12. Thus, a direction toward the negative side terminal of the capacitor 12 from the second terminal of the current limiting resistor 31 and the signal input terminal of the semiconductor switch circuit 22-1 is the reverse bias direction of the Zener diode. When voltage applied to the Zener diode as the constant voltage output unit 32 exceeds breakdown voltage of the Zener diode, current rapidly flows due to avalanche breakdown, and constant voltage equivalent to breakdown voltage appears in the cathode of the Zener diode being the high-potential side terminal of the constant voltage output unit 32. Since the signal input terminal of the semiconductor switch circuit 22-1 being the switch for discharge switch in the discharge circuit 14 is connected to the cathode of the Zener diode being the high-potential side terminal of the constant voltage output unit 32, constant voltage equivalent to breakdown voltage is applied to the signal input terminal of a semiconductor switching element in the semiconductor switch circuit 22-1. In the present embodiment, the Zener diode and the current limiting resistor 31 are selected in such a way that the constant voltage output unit 32 can output such voltage that the semiconductor switching element in the semiconductor switch circuit 22-1 is turned on. Note that the constant voltage output unit 32 may be configured by a varistor, a series regulator, a three-terminal regulator, or the like, instead of a Zener diode.

In the example illustrated in FIG. 1, the switch for power supply disappearance detection in the discharge circuit drive unit 15 is configured by a photo coupler 33-1 including a light emitting element which emits light by current output from the control power supply 17, and a light receiving element which is electrically conducted between an input terminal and an output terminal when receiving light from the light emitting element. The photo coupler 33-1 as the switch for power supply disappearance detection includes the input terminal connected to the second terminal of the current limiting resistor 31, and the output terminal connected to the negative side terminal of the capacitor 12. The light emitting element of the photo coupler 33-1 is connected, via a resistor 34, to a leader line from a power supply line intended for the control power supply 17 to supply power that operates the control unit 16. The input terminal of the light receiving element of the photo coupler 33-1 is connected to the second terminal of the current limiting resistor 31, the high-potential side terminal of the constant voltage output unit 32, and the signal input terminal of the semiconductor switch circuit 22-1 being the switch for discharge switch. Further, the output terminal of the light receiving element of the photo coupler 33-1 is connected to the negative side terminal of the capacitor 12 and the low-potential side terminal of the constant voltage output unit 32. The light emitting element of the photo coupler 33-1 emits light when current is output from the control power supply 17, and therefore, the light emitting element receives the light, and is thus electrically conducted between the input terminal and the output terminal. The light emitting element of the photo coupler 33-1 does not emit light when current is not output from the control power supply 17, and therefore, the light emitting element does not receive light, and thus is not electrically conducted between the input terminal and the output terminal.

A connection relation between the capacitor 12, the discharge circuit 14, and the discharge circuit drive unit 15 that have been described above is summarized as follows. The positive side terminal of the capacitor 12 and the first terminal of the current limiting resistor 31 in the discharge circuit drive unit 15 are connected to each other. The second terminal of the current limiting resistor 31 in the discharge circuit drive unit 15, the cathode of the Zener diode being the high-potential side terminal of the constant voltage output unit 32, the input terminal of the light receiving element of the photo coupler 33-1, and the signal input terminal of the semiconductor switch circuit 22-1 are connected to one another. The low-potential side terminal of the capacitor 12 and the anode of the Zener diode being the low-potential side terminal of the constant voltage output unit 32 are connected to each other.

Furthermore, an operation of the motor drive apparatus 1 according to the first embodiment of the present disclosure is described.

In a condition in which the motor drive apparatus 1 is driving the motor 3, both the breaker 18 and the electromagnetic contactor 19 are in a closed circuit state, the AC power supply 2 and the converter 11 are electrically connected to each other, and the converter 11 converts AC power supplied from the AC power supply 2 into DC power and then outputs the DC power to the DC link. When receiving a power conversion command from the control unit 16, the inverter 13 performs a power conversion operation (powering operation) of converting DC power in the DC link into AC power for motor drive and then outputting the AC power to the motor 3, or a power conversion operation (regenerating operation) of converting AC power generated in the motor 3 into DC power and then returning the DC power to the DC link side. The control unit 16 is operating by power supplied from the control power supply 17. Therefore, since power is supplied to the control unit 16 from the control power supply 17, current flows into the light emitting element of the photo coupler 33-1 as the switch for power supply disappearance detection, and then the light emitting element emits light. In this instance, the light receiving element of the photo coupler 33-1 receives light of the light emitting element, and therefore, is electrically conducted between the input terminal and the output terminal. Accordingly, a closed circuit is configured by the second terminal of the current limiting resistor 31, the input terminal of the light receiving element of the photo coupler 33-1, the output terminal of the light receiving element, the anode of the Zener diode being the low-potential side terminal of the constant voltage output unit 32, and the cathode of the Zener diode being the high-potential side terminal of the constant voltage output unit 32. In other words, the second terminal of the current limiting resistor 31 and the cathode of the Zener diode being the high-potential side terminal of the constant voltage output unit 32 are short-circuited. Therefore, voltage is not supplied to the signal input terminal of the semiconductor switch circuit 22-1 connected to the second terminal of the current limiting resistor 31 and the high-potential side terminal of the constant voltage output unit 32. Consequently, the semiconductor switching element in the semiconductor switch circuit 22-1 remains turned off, and a closed circuit is not configured between the discharge unit 21 and the capacitor 12, and therefore, the discharge unit 21 is not electrically connected to the capacitor 12, and power stored in the capacitor 12 is not discharged in the discharge unit 21 (non-discharge operation).

When abnormal overcurrent flows into the motor drive apparatus 1 due to a factor such as an overload or a short circuit, the breaker 18 opens an electric circuit, and AC power of the AC power supply 2 is no longer supplied to the control power supply 17 and the converter 11. Further, when a power failure occurs in the AC power supply 2 as well, AC power of the AC power supply 2 is no longer supplied to the control power supply 17 and the converter 11. Since the control power supply 17 is not supplied with AC power of the AC power supply 2, the control power supply 17 no longer outputs power for operating the control unit 16. Thus, current does not flow into the light emitting element of the photo coupler 33-1, and the light emitting element does not emit light. The light receiving element of the photo coupler 33-1 does not receive light of the light emitting element, and thus is not electrically conducted between the input terminal and the output terminal. Thus, voltage applied to the capacitor 12 is applied to a series circuit of the current limiting resistor 31 and the Zener diode being the constant voltage output unit 32. When voltage applied to the Zener diode being the constant voltage output unit 32 exceeds breakdown voltage of the Zener diode, current rapidly flows due to avalanche breakdown, and constant voltage equivalent to breakdown voltage appears in the cathode of the Zener diode being the high-potential side terminal of the constant voltage output unit 32. The signal input terminal of the semiconductor switch circuit 22-1 being the switch for discharge switch is connected to the cathode of the Zener diode being the high-potential side terminal of the constant voltage output unit 32. Thus, since constant voltage equivalent to breakdown voltage of the Zener diode being the constant voltage output unit 32 is applied to the signal input terminal of the semiconductor switch circuit 22-1, the semiconductor switching element in the semiconductor switch circuit 22-1 is turned on. Further, since AC power of the AC power supply 2 is no longer supplied to the converter 11 either, output of DC power from the converter 11 is stopped. Thus, a closed circuit is configured between the discharge unit 21 and the capacitor 12. As a result, the capacitor 12 and the discharge unit 21 are electrically connected to each other, and power stored in the capacitor 12 is discharged in the discharge unit 21 (discharge operation).

As described above, when abnormal overcurrent flows into the motor drive apparatus 1 due to a factor such as an overload or a short circuit and thus the breaker 18 opens an electric circuit, or when a power failure occurs in the AC power supply 2, AC power of the AC power supply 2 is no longer supplied to the control power supply 17 and the converter 11, and power to the control unit 16 disappears from the control power supply 17. In the present embodiment, disappearance of drive power to the control unit 16 from the control power supply 17 is detected by the photo coupler 33-1 as the switch for power supply disappearance detection, this detection result is electrically transmitted to the signal input terminal of the semiconductor switch circuit 22-1 being the switch for discharge switch in the discharge circuit 14, and thus, the capacitor 12 and the discharge unit 21 in the discharge circuit 14 are electrically connected to each other. In the present embodiment, voltage is generated in the cathode of the Zener diode being the high-potential side terminal of the constant voltage output unit 32, based on DC power stored in the capacitor 12, the semiconductor switching element of the semiconductor switch circuit 22-1 is turned on by the voltage, and thereby, the discharge circuit 14 is switched from a non-discharge operation to a discharge operation. In other words, DC power stored in the capacitor 12 provided in the DC link is used as drive power for switch drive by the discharge circuit drive unit 15. Thus, according to the present embodiment, there is no need to provide a dedicated power supply backup circuit which supplies power for switching a discharge circuit from a non-discharge operation to a discharge operation, a circuit mounting area and the number of components does not increase, and cost is low. Further, a configuration of the discharge circuit drive unit 15 is simpler than a configuration of a power supply backup circuit and has the small number of components, and therefore, has low risk of a failure and is highly reliable. Further, since a discharge time is shortened by discharging DC power stored in the capacitor 12 in the discharge unit 21 in the discharge circuit 14, it is possible to start maintenance and replacement work or recovery work early after power-off of the motor drive apparatus 1 or occurrence of a power failure, a risk of an electric shock is reduced, and work efficiency is also improved. For example, when the discharge unit 21 in the discharge circuit 14 is configured by light emitting equipment such as an LED or a light bulb, acoustic equipment such as a buzzer or a speaker, a motor, and the like, these pieces of equipment act in such a form that discharge being performed is visible to a worker during a discharge period, and therefore, it is possible to call worker's attention to a risk of an electric shock, and safety is ensured. Further, since discharge is not performed in the discharge circuit 14 during a normal operation of the motor drive apparatus 1, wasteful power consumption is not produced, leading to efficiency. In this way, according to the present embodiment, it is possible to implement the low-cost and highly reliable motor drive apparatus 1 being capable of discharging the capacitor 12 provided in the DC link between the converter 11 and the inverter 13 early and certainly at a time of power supply disappearance.

Note that the discharge as described above may be performed not only when abnormal overcurrent flows into the motor drive apparatus 1 due to a factor such as an overload or a short circuit and thus the breaker 18 opens an electric circuit, or when a power failure occurs in the AC power supply 2, but also when an operation of the motor drive apparatus 1 is normally stopped. For example, AC power input to the control power supply 17 is taken in from the electromagnetic contactor 19 and the converter 11, and then AC power of the AC power supply 2 is no longer supplied to the control power supply 17 and the converter 11 when the electromagnetic contactor 19 is brought into an open state in order to normally stop an operation of the motor drive apparatus 1, and consequently, it is also possible to cause the discharge circuit 14 and the discharge circuit drive unit 15 to perform the above-described operation. Further, when a stop command is output to the inverter 13 from the control unit 16, it is also possible to cause the discharge circuit 14 and the discharge circuit drive unit 15 to perform the above-described operation by amplifying the stop command to current having predetermined intensity and then passing the current to the light emitting element of the photo coupler 33-1.

Figure 2:
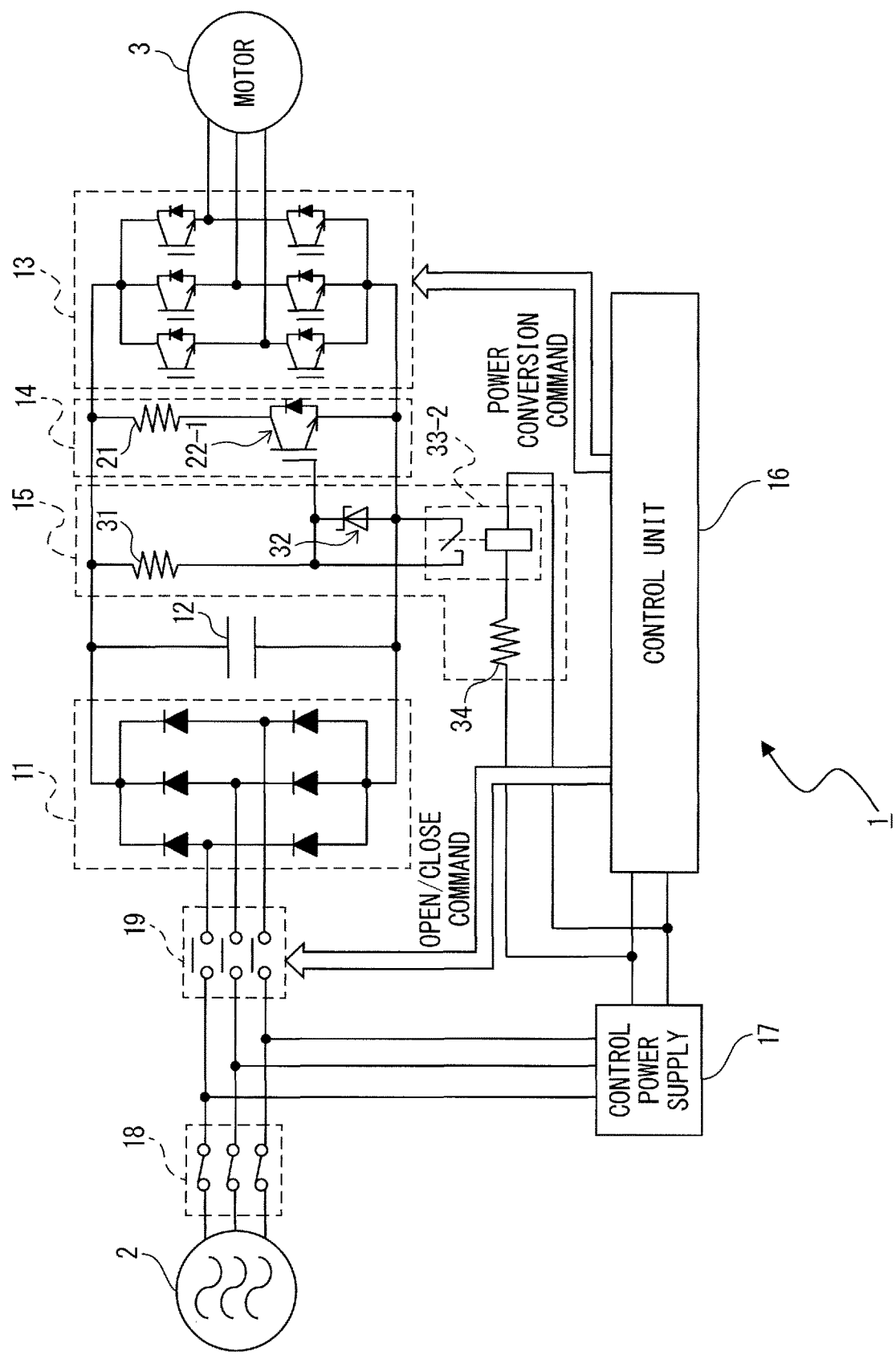
FIG. 2 is a diagram illustrating a further mode of a discharge circuit drive unit in the motor drive apparatus according to the first embodiment of the present disclosure.

Although the photo coupler 33-1 is used as the switch for power supply disappearance detection in the discharge circuit drive unit 15 in the first embodiment illustrated in FIG. 1, an A contact relay may be used as the switch for power supply disappearance detection instead of the photo coupler 33-1. FIG. 2 is a diagram illustrating a further mode of a discharge circuit drive unit in the motor drive apparatus according to the first embodiment of the present disclosure.

As illustrated in FIG. 2, the switch for power supply disappearance detection in the discharge circuit drive unit 15 is composed of an A contact relay 33-2. The A contact relay 33-2 is a "normally-off" type relay in which a contact is turned on when current is flowing therein, and the contact is turned off when current is not flowing therein. The A contact relay 33-2 as the switch for power supply disappearance detection has the contact turned on and is thus electrically conducted between an input terminal and an output terminal when current is output from the control power supply 17, whereas the A contact relay 33-2 as the switch for power supply disappearance detection has the contact turned off and thus is not electrically conducted between the input terminal and the output terminal when current is not output from the control power supply 17. Thus, even when the switch for power supply disappearance detection in the discharge circuit drive unit 15 is configured by the A contact relay 33-2, it is possible to implement an operation similar to that of the photo coupler 33-1 described with reference to FIG. 1. Note that circuit components other than the A contact relay 33-2 are similar to the circuit components illustrated in FIG. 1, and therefore, the same reference signs are given to the same circuit components, and thus, detailed descriptions of the circuit components are omitted.

Figure 3:
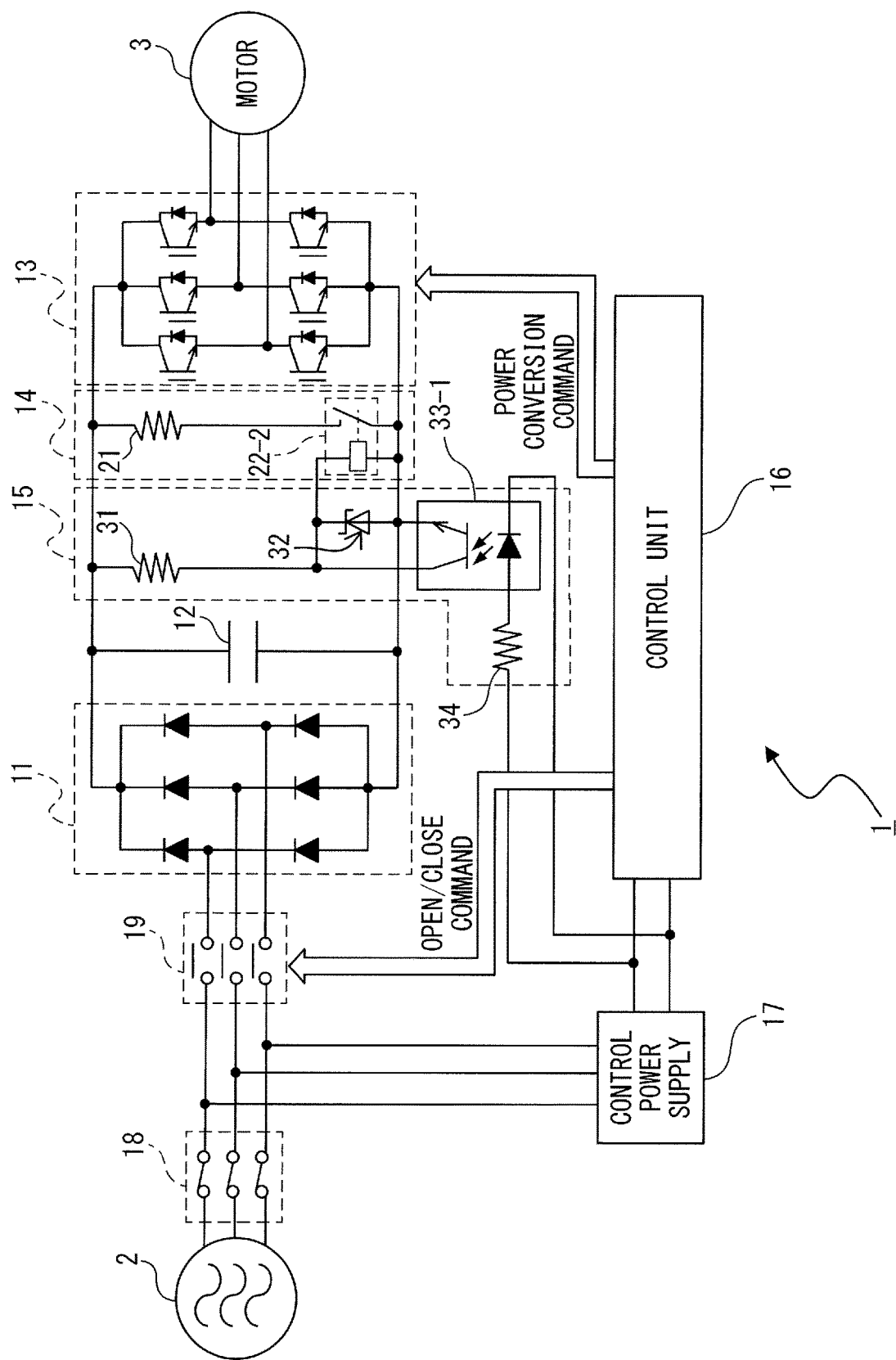
FIG. 3 is a diagram illustrating a further mode of a discharge circuit in the motor drive apparatus according to the first embodiment of the present disclosure.

Furthermore, although the semiconductor switch circuit 22-1 is used as the switch for discharge switch in the discharge circuit 14 in the first embodiment illustrated in FIG. 1, an A contact relay may be used as the switch for discharge switch instead of the semiconductor switch circuit 22-1. FIG. 3 is a diagram illustrating a further mode of a discharge circuit in the motor drive apparatus according to the first embodiment of the present disclosure. As illustrated in FIG. 3, the switch for discharge switch in the discharge circuit 14 is composed of an A contact relay 22-2. The A contact relay 22-2 is a "normally-off" type relay in which a contact is turned on when current is flowing therein, and the contact is turned off when current is not flowing therein. The A contact relay 22-2 as the switch for discharge switch has the contact turned on and thus electrically connects the capacitor 12 and the discharge unit 21 to each other when constant voltage output by the constant voltage output unit 32 is applied, whereas the A contact relay 22-2 as the switch for discharge switch has the contact turned off and thus cuts electric connection between the capacitor 12 and the discharge unit 21 when constant voltage output by the constant voltage output unit 32 is not applied. Thus, even when the switch for discharge switch in the discharge circuit 14 is configured by the A contact relay 22-2, it is possible to implement an operation similar to that of the semiconductor switch circuit 22-1 described with reference to FIG. 1. Note that circuit components other than the A contact relay 22-2 are similar to the circuit components illustrated in FIG. 1, and therefore, the same reference signs are given to the same circuit components, and thus, detailed descriptions of the circuit components are omitted.

Figure 4:
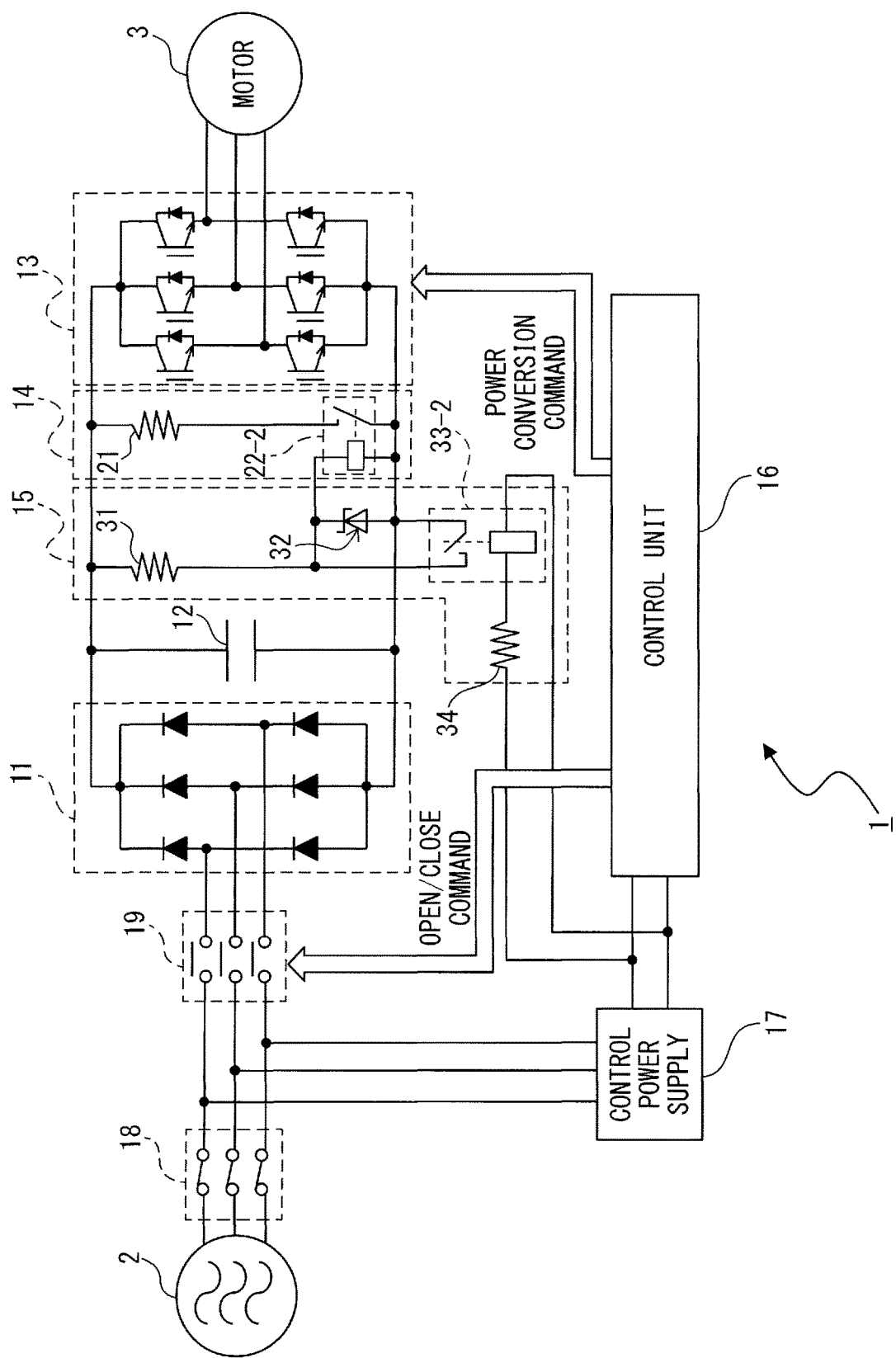
FIG. 4 is a diagram illustrating further modes of the discharge circuit and the discharge circuit drive unit in the motor drive apparatus according to the first embodiment of the present disclosure.

The discharge circuit drive unit 15 and the discharge circuit 14 in the first embodiment may be implemented by combining the A contact relay 33-2 as the switch for power supply disappearance detection described with reference to FIG. 2 with the A contact relay 22-2 as the switch for discharge switch described with reference to FIG. 3. FIG. 4 is a diagram illustrating further modes of the discharge circuit and the discharge circuit drive unit in the motor drive apparatus according to the first embodiment of the present disclosure. As illustrated in FIG. 4, the switch for power supply disappearance detection in the discharge circuit drive unit 15 is composed of the A contact relay 33-2, and the switch for discharge switch in the discharge circuit 14 is composed of the A contact relay 22-2. The A contact relay 33-2 as the switch for power supply disappearance detection has a contact turned on and is thus electrically conducted between an input terminal and an output terminal when current is output from the control power supply 17, whereas the A contact relay 33-2 as the switch for power supply disappearance detection has the contact turned off and thus is not electrically conducted between an input terminal and an output terminal when current is not output from the control power supply 17. The A contact relay 22-2 as the switch for discharge switch has a contact turned on and thus electrically connects the capacitor 12 and the discharge unit 21 to each other when constant voltage output by the constant voltage output unit 32 is applied, whereas the A contact relay 22-2 as the switch for discharge switch has the contact turned off and thus cuts electric connection between the capacitor 12 and the discharge unit 21 when constant voltage output by the constant voltage output unit 32 is not applied. Thus, even when the switch for power supply disappearance detection in the discharge circuit drive unit 15 is configured by the A contact relay 33-2, and the switch for discharge switch in the discharge circuit 14 is configured by the A contact relay 22-2, it is possible to implement an operation similar to those of the photo coupler 33-1 and the semiconductor switch circuit 22-1 described with reference to FIG. 1. Note that circuit components other than the A contact relay 22-2 and the A contact relay 33-2 are similar to the circuit components illustrated in FIG. 1, and therefore, the same reference signs are given to the same circuit components, and thus, detailed descriptions of the circuit components are omitted.

Furthermore, a circuit configuration of a motor drive apparatus 1 according to a second embodiment of the present disclosure is described. In the first embodiment described above, the switch for power supply disappearance detection is configured by the photo coupler 33-1 illustrated in FIG. 1 or 3 or the A contact relay 33-2 illustrated in FIG. 2 or 4. In the second embodiment of the present disclosure, a switch for power supply disappearance detection is configured by a B contact relay instead of the photo coupler 33-1 or the A contact relay 33-2.

Figure 5:
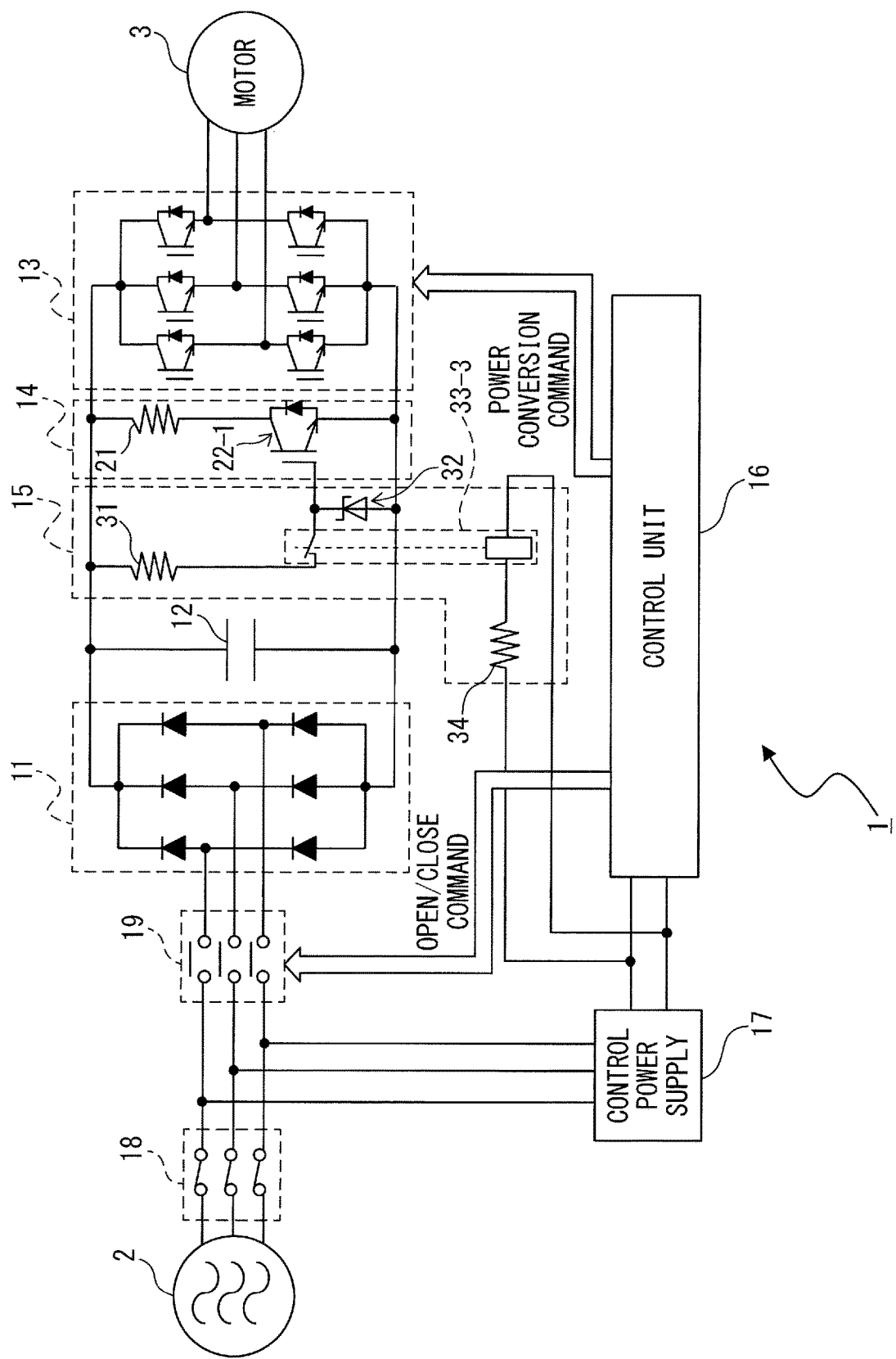
FIG. 5 is a diagram illustrating a motor drive apparatus according to a second embodiment of the present disclosure.

FIG. 5 is a diagram illustrating a motor drive apparatus according to the second embodiment of the present disclosure.

In FIG. 5, a switch for power supply disappearance detection is configured by a B contact relay 33-3 instead of the photo coupler 33-1 described with reference to FIGS. 1 and 3. As illustrated in FIG. 5, the discharge circuit drive unit 15 includes a current limiting resistor 31, a constant voltage output unit 32, and the B contact relay 33-3 as a switch for power supply disappearance detection.

The current limiting resistor 31 includes a first terminal connected to a positive side terminal of a capacitor 12, and a second terminal to which current input from the first terminal is output.

The B contact relay 33-3 as the switch for power supply disappearance detection is a "normally-on" type relay in which a contact is turned off when current is flowing therein, and the contact is turned on when current is not flowing therein. The B contact relay 33-3 includes an input terminal connected to the second terminal of the current limiting resistor 31, and an output terminal to which current input to the input terminal is output at a time of electric conduction. The B contact relay 33-3 has the contact turned off and is thus electrically conducted between the input terminal and the output terminal when current is output from a control power supply 17, whereas the B contact relay 33-3 has the contact turned on and thus is not electrically conducted between an input terminal and an output terminal when current is not output from the control power supply 17.

The constant voltage output unit 32 includes a high-potential side terminal connected to the output terminal of the B contact relay 33-3 as the switch for power supply disappearance detection, and a low-potential side terminal connected to a negative side terminal of the capacitor 12. The constant voltage output unit 32 outputs predetermined constant voltage between the high-potential side terminal and the low-potential side terminal. The constant voltage output unit 32 is composed of a Zener diode connected in such a way that, for example, the high-potential side terminal serves as a cathode, and the low-potential side terminal serves as an anode. The Zener diode as the constant voltage output unit 32 has the cathode connected to the output terminal of the B contact relay 33-3 and a signal input terminal of a semiconductor switch circuit 22-1 being a switch for discharge switch in a discharge circuit 14, and the anode connected to the negative side terminal of the capacitor 12. Thus, a direction toward the negative side terminal of the capacitor 12 from the output terminal of the B contact relay 33-3 and the signal input terminal of the semiconductor switch circuit 22-1 is a reverse bias direction of the Zener diode. When voltage applied to the Zener diode as the constant voltage output unit 32 exceeds breakdown voltage of the Zener diode, current rapidly flows due to avalanche breakdown, and constant voltage equivalent to breakdown voltage appears in the cathode of the Zener diode being the high-potential side terminal of the constant voltage output unit 32. Since the signal input terminal of the semiconductor switch circuit 22-1 being the switch for discharge switch in the discharge circuit 14 is connected to the cathode of the Zener diode being the high-potential side terminal of the constant voltage output unit 32, constant voltage equivalent to breakdown voltage is applied to the signal input terminal of a semiconductor switching element in the semiconductor switch circuit 22-1, but in the present embodiment, the Zener diode and the current limiting resistor 31 are selected in such a way that the constant voltage output unit 32 can output such voltage that the semiconductor switching element in the semiconductor switch circuit 22-1 is turned on. Note that the constant voltage output unit 32 may be configured by a varistor, a series regulator, a three-terminal regulator, or the like, instead of a Zener diode.

A connection relation between the capacitor 12, the discharge circuit 14, and the discharge circuit drive unit 15 that have been described above is summarized as follows. The positive side terminal of the capacitor 12 and the first terminal of the current limiting resistor 31 in the discharge circuit drive unit 15 are connected to each other. The second terminal of the current limiting resistor 31 in the discharge circuit drive unit 15 and the input terminal of the B contact relay 33-3 as the switch for power supply disappearance detection are connected to one another. The output terminal of the B contact relay 33-3 as the switch for power supply disappearance detection, the cathode of the Zener diode being the high-potential side terminal of the constant voltage output unit 32, and the signal input terminal of the semiconductor switch circuit 22-1 are connected to one another. The low-potential side terminal of the capacitor 12 and the anode of the Zener diode being the low-potential side terminal of the constant voltage output unit 32 are connected to each other.

Furthermore, an operation of the motor drive apparatus 1 according to the second embodiment of the present disclosure is described.

In a condition in which the motor drive apparatus 1 is driving the motor 3, both a breaker 18 and an electromagnetic contactor 19 are in a closed circuit state, an AC power supply 2 and a converter 11 are electrically connected to each other, and the converter 11 converts AC power supplied from the AC power supply 2 into DC power and then outputs the DC power to a DC link. When receiving a power conversion command from a control unit 16, the inverter 13 performs a power conversion operation (powering operation) of converting DC power in the DC link into AC power for motor drive and then outputting the AC power to the motor 3, or a power conversion operation (regenerating operation) of converting AC power regenerated in the motor 3 into DC power and then returning the DC power to the DC link side. The control unit 16 is operating by power supplied from the control power supply 17. Therefore, since power is supplied to the control unit 16 from the control power supply 17, the contact of the B contact relay 33-3 as the switch for power supply disappearance detection is turned off, and the B contact relay 33-3 is not electrically conducted between the input terminal and the output terminal. Thus, voltage is not applied to the signal input terminal of the semiconductor switch circuit 22-1 connected to the high-potential side terminal of the constant voltage output unit 32. Consequently, the semiconductor switching element in the semiconductor switch circuit 22-1 remains turned off, and a closed circuit is not configured between a discharge unit 21 and the capacitor 12, and therefore, the discharge unit 21 is not electrically connected to the capacitor 12, and power stored in the capacitor 12 is not discharged in the discharge unit 21 (non-discharge operation).

When abnormal overcurrent flows into the motor drive apparatus 1 due to a factor such as an overload or a short circuit, the breaker 18 opens an electric circuit, and AC power of the AC power supply 2 is no longer supplied to the control power supply 17 and the converter 11. Further, when a power failure occurs in the AC power supply 2 as well, AC power of the AC power supply 2 is no longer supplied to the control power supply 17 and the converter 11. When the control power supply 17 is no longer supplied with AC power of the AC power supply 2, the control power supply 17 no longer outputs power for operating the control unit 16. Thus, the contact of the B contact relay 33-3 being the switch for power supply disappearance detection is turned on, and the B contact relay 33-3 is electrically conducted between the input terminal and the output terminal. Thus, voltage applied to the capacitor 12 is applied to a series circuit of the current limiting resistor 31 and the Zener diode being the constant voltage output unit 32. When voltage applied to the Zener diode being the constant voltage output unit 32 exceeds breakdown voltage of the Zener diode, current rapidly flows due to avalanche breakdown, and constant voltage equivalent to breakdown voltage appears in the cathode of the Zener diode being the high-potential side terminal of the constant voltage output unit 32. The signal input terminal of the semiconductor switch circuit 22-1 being the switch for discharge switch is connected to the cathode of the Zener diode being the high-potential side terminal of the constant voltage output unit 32. Thus, since constant voltage equivalent to breakdown voltage of the Zener diode being the constant voltage output unit 32 is applied to the signal input terminal of the semiconductor switch circuit 22-1, the semiconductor switching element in the semiconductor switch circuit 22-1 is turned on. Further, since AC power of the AC power supply 2 is no longer supplied to the converter 11 either, output of DC power from the converter 11 is stopped. Thus, a closed circuit is configured between the discharge unit 21 and the capacitor 12. As a result, the capacitor 12 and the discharge unit 21 are electrically connected to each other, and power stored in the capacitor 12 is discharged in the discharge unit 21 (discharge operation). Note that circuit components other than the discharge circuit 14 and the discharge circuit drive unit 15 are similar to the circuit components illustrated in FIG. 5, and therefore, the same reference signs are given to the same circuit components, and thus, detailed descriptions of the circuit components are omitted.

In this way, according to the second embodiment described with reference to FIG. 5 as well, it is possible to implement a discharge operation and a non-discharge operation of the discharge circuit 14 similar to those in the first embodiment.

Figure 6:
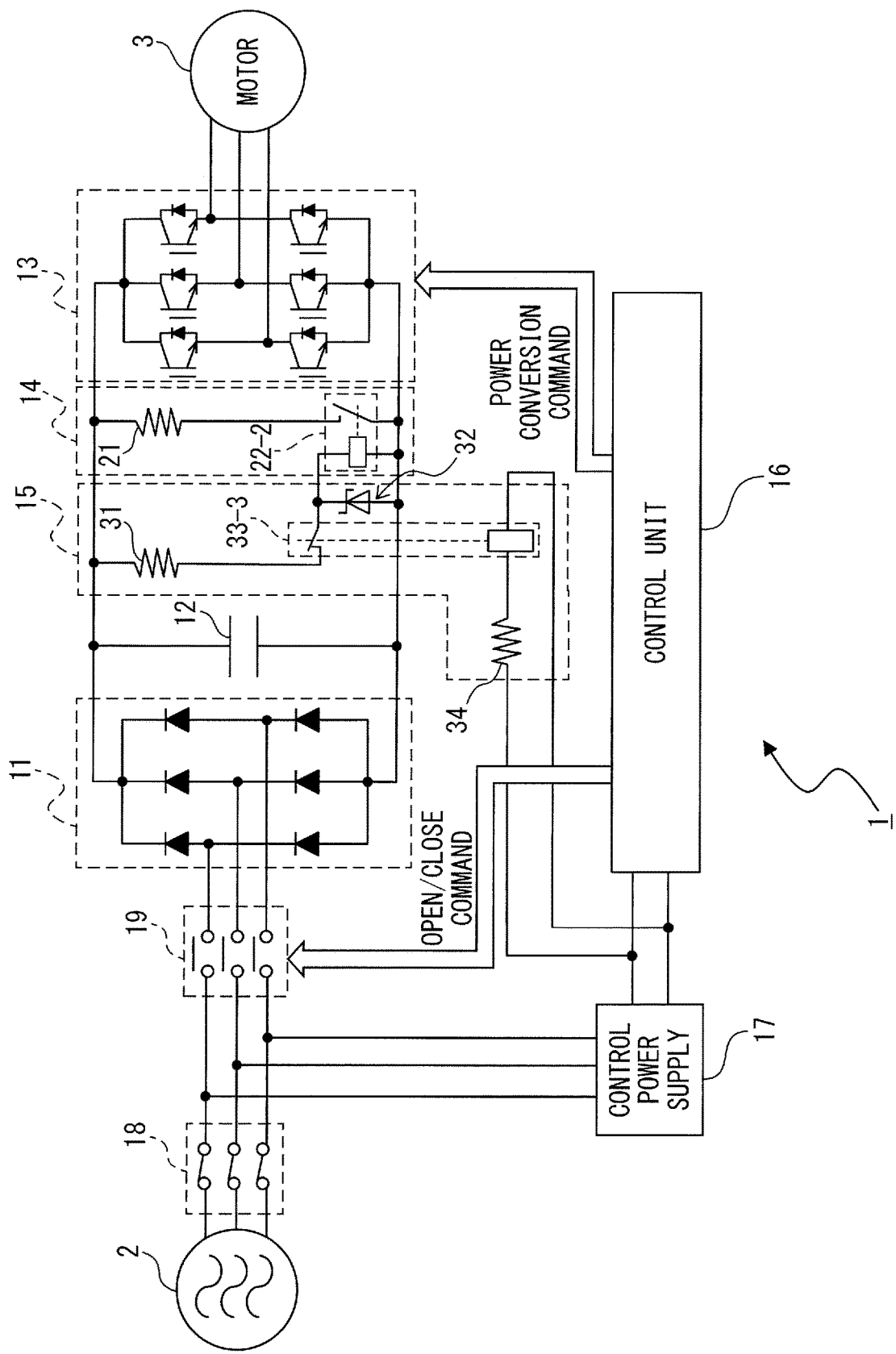
FIG. 6 is a diagram illustrating a further mode of a discharge circuit in the motor drive apparatus according to the second embodiment of the present disclosure.

Although the semiconductor switch circuit 22-1 is used as the switch for discharge switch in the discharge circuit 14 in the second embodiment illustrated in FIG. 2, an A contact relay may be used as the switch for discharge switch instead of the semiconductor switch circuit 22-1. FIG. 6 is a diagram illustrating a further mode of a discharge circuit in the motor drive apparatus according to the second embodiment of the present disclosure. As illustrated in FIG. 6, the switch for discharge switch in the discharge circuit 14 is composed of an A contact relay 22-2. The A contact relay 22-2 as the switch for discharge switch has the contact turned on and thus electrically connects the capacitor 12 and the discharge unit 21 to each other when constant voltage output by the constant voltage output unit 32 is applied, whereas the A contact relay 22-2 as the switch for discharge switch has the contact turned off and thus cuts electric connection between the capacitor 12 and the discharge unit 21 when constant voltage output by the constant voltage output unit 32 is not applied. Thus, even when the switch for discharge switch in the discharge circuit 14 is the A contact relay 22-2, it is possible to implement an operation similar to that of the semiconductor switch circuit 22-1 described with reference to FIG. 5. Note that circuit components other than the A contact relay 22-2 are similar to the circuit components illustrated in FIG. 5, and therefore, the same reference signs are given to the same circuit components, and thus, detailed descriptions of the circuit components are omitted.

According to one aspect of the present disclosure, it is possible to implement a low-cost and highly reliable motor drive apparatus being capable of discharging a capacitor provided in a DC link between a converter and an inverter early and certainly at a time of power supply disappearance.

The invention claimed is:

1. A motor drive apparatus comprising:
a converter configured to convert AC power from an AC power supply into DC power and then output the DC power to a DC link;
a capacitor provided in the DC link;
an inverter configured to convert DC power in the DC link into AC power for motor drive and then output the AC power;
a discharge circuit provided in parallel with the capacitor in the DC link, the discharge circuit being selectively switched, via a switch, between a discharge operation of discharging DC power in the DC link by electrically connecting the discharge circuit and the capacitor to each other via the switch, and a non-discharge operation of cutting electric connection between the discharge circuit and the capacitor via the switch;
a discharge circuit drive unit configured to perform switch drive of the discharge operation and the non-discharge operation of the discharge circuit by applying a voltage to a control terminal of the switch; and
a first terminal of the current limiting resistor connected to a positive side terminal of the capacitor and a second terminal of the current limiting resistor connected to the control terminal of the switch;
wherein the discharge circuit drive unit is configured to perform the switch drive of the discharge operation by applying the voltage to the control terminal of the switch, the voltage being due to the DC power flowing from the capacitor in the DC link through the current limiting resistor.

2. The motor drive apparatus according to claim 1, wherein the discharge circuit includes:
a discharge unit; and
a switch for discharge switch configured to switch electric connection between the discharge unit and the capacitor, and cutting of electric connection between the discharge unit and the capacitor, in response to switch drive by the discharge circuit drive unit.

3. The motor drive apparatus according to claim 1, further comprising:
a control unit configured to control the inverter; and
a control power supply configured to generate power for operating the control unit, based on AC power from the AC power supply, wherein
the discharge circuit drive unit switches the discharge circuit from the non-discharge operation to the discharge operation at a time of disappearance of the power from the control power supply.

4. The motor drive apparatus according to claim 3, further comprising a breaker provided between the converter and the control power supply, and the AC power supply.

5. A motor drive apparatus comprising:
a converter configured to convert AC power from an AC power supply into DC power and then output the DC power to a DC link;
a capacitor provided in the DC link;
an inverter configured to convert DC power in the DC link into AC power for motor drive and then output the AC power;
a discharge circuit provided in parallel with the capacitor in the DC link, the discharge circuit being selectively switched between a discharge operation of discharging DC power in the DC link by electrically connecting the discharge circuit and the capacitor to each other, and a non-discharge operation of cutting electric connection between the discharge circuit and the capacitor; and
a discharge circuit drive unit configured to perform switch drive of the discharge operation and the non-discharge operation of the discharge circuit, the discharge circuit drive unit using DC power in the DC link as drive power for the switch drive,
wherein the discharge circuit includes:
a discharge unit; and
a switch for discharge switch configured to switch electric connection between the discharge unit and the capacitor, and cutting of electric connection between the discharge unit and the capacitor, in response to switch drive by the discharge circuit drive unit,
wherein the discharge circuit drive unit includes:
a current limiting resistor including a first terminal connected to a positive side terminal of the capacitor, and a second terminal to which current input from the first terminal is output;

a constant voltage output unit including a high-potential side terminal connected to the second terminal of the current limiting resistor, and a low-potential side terminal connected to a negative side terminal of the capacitor, and configured to output predetermined constant voltage between the high-potential side terminal and the low-potential side terminal; and a switch for power supply disappearance detection including an input terminal connected to the second terminal of the current limiting resistor, and an output terminal connected to the negative side terminal of the capacitor, the switch for power supply disappearance detection being electrically conducted between the input terminal and the output terminal when current is output from the control power supply, the switch for power supply disappearance detection being not electrically conducted between the input terminal and the output terminal when current is not output from the control power supply, wherein the switch for discharge switch of the discharge circuit includes a signal input terminal connected to the high-potential side terminal of the constant voltage output unit, and the switch for discharge switch of the discharge circuit electrically connects the discharge unit and the capacitor to each other when the constant voltage output by the constant voltage output unit is applied via the signal input terminal, whereas the switch for discharge switch of the discharge circuit cuts electric connection between the discharge unit and the capacitor when the constant voltage output by the constant voltage output unit is not applied.

6. The motor drive apparatus according to claim 5, wherein the switch for power supply disappearance detection is composed of a photo coupler including a light emitting element which emits light by current output from the control power supply, and a light receiving element which is electrically conducted between the input terminal and the output terminal when receiving light from the light emitting element.

7. The motor drive apparatus according to claim 5, wherein the switch for power supply disappearance detection is composed of an A contact relay which is electrically conducted between the input terminal and the output terminal when current is output from the control power supply, and is not electrically conducted between the input terminal and the output terminal when current is not output from the control power supply.

8. The motor drive apparatus according to claim 5, wherein the switch for power supply disappearance detection is composed of an B contact relay which is not electrically conducted between the input terminal and the output terminal when current is output from the control power supply, and is electrically conducted between the input terminal and the output terminal when current is not output from the control power supply.

9. The motor drive apparatus according to claim 5, wherein the constant voltage output unit is composed of a Zener diode connected in such a way that the high-potential side terminal serves as a cathode, and the low-potential side terminal serves as an anode.

10. A motor drive apparatus comprising:

a converter configured to convert AC power from an AC power supply into DC power and then output the DC power to a DC link;

a capacitor provided in the DC link;

an inverter configured to convert DC power in the DC link into AC power for motor drive and then output the AC power;

a discharge circuit provided in parallel with the capacitor in the DC link, the discharge circuit being selectively switched between a discharge operation of discharging DC power in the DC link by electrically connecting the discharge circuit and the capacitor to each other, and a non-discharge operation of cutting electric connection between the discharge circuit and the capacitor; and a discharge circuit drive unit configured to perform switch drive of the discharge operation and the non-discharge operation of the discharge circuit, the discharge circuit drive unit using DC power in the DC link as drive power for the switch drive, wherein the discharge circuit includes:
  a discharge unit; and
  a switch for discharge switch configured to switch electric connection between the discharge unit and the capacitor, and cutting of electric connection between the discharge unit and the capacitor, in response to switch drive by the discharge circuit drive unit, wherein the discharge circuit drive unit includes:
  a current limiting resistor including a first terminal connected to a positive side terminal of the capacitor, and a second terminal to which current input from the first terminal is output;
  a switch for power supply disappearance detection including an input terminal connected to the second terminal of the current limiting resistor, and an output terminal to which current input to the input terminal is output at a time of electric conduction, the switch for power supply disappearance detection being not electrically conducted between the input terminal and the output terminal when current is output from the control power supply, the switch for power supply disappearance detection being electrically conducted between the input terminal and the output terminal when current is not output from the control power supply; and
  a constant voltage output unit including a high-potential side terminal connected to the output terminal of the switch for power supply disappearance detection, and a low-potential side terminal connected to a negative side terminal of the capacitor, and configured to output predetermined constant voltage between the high-potential side terminal and the low-potential side terminal, wherein the switch for discharge switch of the discharge circuit includes a signal input terminal connected to the high-potential side terminal of the constant voltage output unit, and the switch for discharge switch of the discharge circuit electrically connects the discharge unit and the capacitor to each other when the constant voltage output by the constant voltage output unit is applied via the signal input terminal, whereas the switch for discharge switch of the discharge circuit cuts electric connection between the discharge unit and the capacitor when the constant voltage output by the constant voltage output unit is not applied.

* * * * *